(12) United States Patent
Kannan (10) Patent No.: US 11,767,897 B1
(45) Date of Patent: Sep. 26, 2023

(54) ADDITIVE MANUFACTURED SYMMETRIC LOW UNBALANCE GOVERNOR SPRINGS

(71) Applicant: Hamilton Sundstrand Corporation, Charlotte, NC (US)

(72) Inventor: Kanthi G. Kannan, Katy, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/885,322

(22) Filed: Aug. 10, 2022

(51) Int. Cl.
*F16F 3/02* (2006.01)

(52) U.S. Cl.
CPC .......... *F16F 3/023* (2013.01); *F05D 2220/34* (2013.01); *F16F 2226/04* (2013.01); *F16F 2228/007* (2013.01); *F16F 2232/08* (2013.01); *F16F 2238/022* (2013.01)

(58) Field of Classification Search
CPC .. F16F 3/023; F16F 2226/04; F16F 2228/007; F16F 2232/08; F16F 2238/022; F05D 2220/34
See application file for complete search history.

(56) References Cited

U.S. PATENT DOCUMENTS

| | | | |
|---|---|---|---|
| 4,743,163 A | 5/1988 | Markunas et al. | |
| 5,562,417 A | 10/1996 | Grimm et al. | |
| 7,419,357 B2 | 9/2008 | Nohn et al. | |
| 9,878,800 B2 | 1/2018 | Russ et al. | |
| 10,093,430 B2 | 10/2018 | Russ et al. | |
| 2022/0074459 A1* | 3/2022 | Kawazoe | F16F 1/3732 |

* cited by examiner

*Primary Examiner* — Jacob M Amick
*Assistant Examiner* — Charles J Brauch
(74) *Attorney, Agent, or Firm* — Kinney & Lange, P.A.

(57) ABSTRACT

A symmetric governor spring includes a first ring and a second ring coaxial with the first ring. The symmetric governor spring also includes two or more inclined braces connecting the first ring to the second ring. The first ring, the second ring, and the two or more inclined braces are integrally formed.

17 Claims, 8 Drawing Sheets

ADDITIVE MANUFACTURED SYMMETRIC LOW UNBALANCE GOVERNOR SPRINGS

BACKGROUND

The present disclosure relates to control mechanisms for propeller driven apparatuses, such as turbines, motors or generators, and in particular to governor springs of ram air turbines.

Ram air turbines (RAT) can be deployed into a fluid stream such that the fluid stream causes propellers of the RAT to rotate. That rotation can be harnessed to generate mechanical, hydraulic, or electric power for a variety of purposes. This power can be used as emergency power during engine failures. A governor spring is an integral part of the governor which controls the blade position of the RAT to maintain a fixed operating speed range for power generation. The governor springs are typically helical springs. During operation, the governor spring can introduce significant transverse vibration into the RAT. These self-induced vibrations can lead to noise and can excite RAT modes which drives increase in the weight requirements for other component parts of the RAT. Therefore, design solutions to reduce vibrations at its source are desired.

SUMMARY

In one embodiment, a symmetric governor spring includes a first ring, a second ring coaxial with the first ring, and two or more inclined braces connecting the first ring to the second ring. The first ring, the second ring, and the two or more inclined braces are integrally formed.

In another embodiment, a symmetric governor spring includes a first ring coaxial with a central axis, a second ring coaxial with the first ring, and a third ring coaxial with the first ring. The symmetric governor spring further includes a first set of two or more inclined braces connecting the first ring to the second ring and a second set of two or more inclined braces connecting the second ring to the third ring.

In another embodiment, a ram air turbine includes turbine blades rotatably attached to a turbine hub and a governor mechanism within the turbine hub for automatically adjusting a pitch of the turbine blades to maintain a rotational speed range of the turbine hub. The governor mechanism includes a governor shaft defining a central axis and a symmetric governor spring extending circumferentially about the governor shaft. The symmetric governor spring includes a first ring coaxial with the central axis and defining a first end of the symmetric governor spring, a second ring coaxial with the central axis, and a third ring coaxial with the central axis and defining a second end of the symmetric governor spring. The symmetric governor spring further includes a first set of two or more inclined braces connecting the first ring to the second ring and a second set of two or more inclined braces connecting the second ring to the third ring. The governor mechanism further includes a fixed spring support connected to the first end of the symmetric governor spring and a sliding spring support connected to the second end of the symmetric governor spring.

DETAILED DESCRIPTION

This disclosure relates to a symmetric spring, and in particular to an additively manufactured symmetric spring for use in a ram air turbine (RAT) mechanical governor. The weight of the spring is symmetrically distributed which results in essentially zero unbalance and thus reduces the vibrations formed during operation of the RAT. Reducing vibrations generated during operation of the RAT can improve aircraft occupant satisfaction as well as reduce the weight requirements of other component parts of the RAT. The symmetric spring will be discussed below with reference to FIGS. 1-4.

Figure 1:
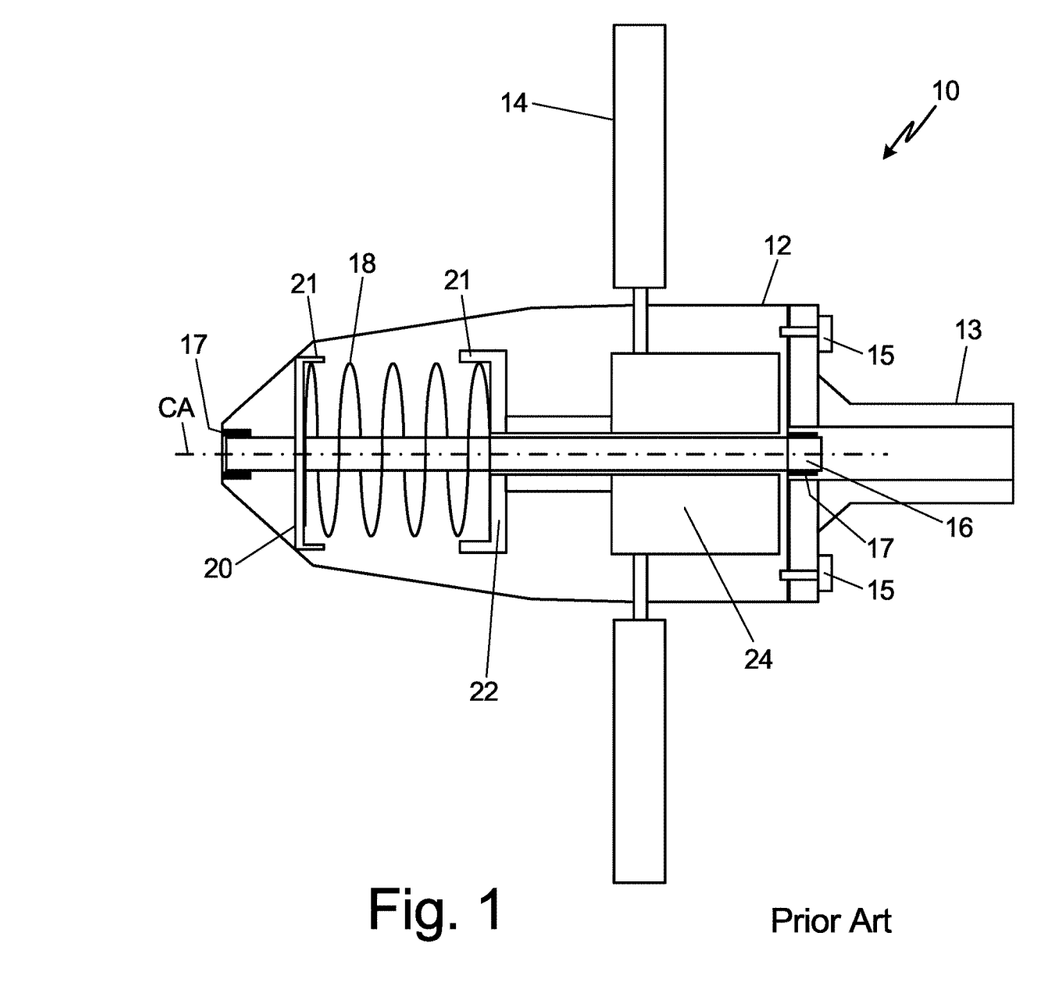
FIG. 1 is a schematic diagram of a ram air turbine where a governor mechanism interfaces with a prior art helical spring.

FIG. 1 is a schematic diagram of ram air turbine 10 where governor mechanism 24 interfaces with helical governor spring 18. Ram air turbine 10 comprises turbine hub 12, drive shaft 13, blades 14, bolt 15, governor shaft 16, bearing 17, helical governor spring 18, fixed spring support 20, spring support lip 21, sliding spring support 22, mechanical governor 24, and central axis CA.

Ram air turbine 10 can be deployed into an airstream from an aircraft to supplement or replace onboard power during a power failure. Ram air turbine 10 can supply this power as mechanical, pneumatic, and/or electrical power. Ram air turbine 10 as shown in FIG. 1 is connected to a deployment mechanism (not shown) and a generating mechanism (now shown). The deployment mechanism allows for a pilot of the aircraft or a computer aide to the pilot to deploy ram air turbine 10 when desired or required. The generating mechanism converts rotational energy extracted from the airstream by blades 14 into the desired energy type.

Turbine hub 12 encloses a first end of blades 14, a fore end of governor shaft 16, helical governor spring 18, fixed spring support 20, sliding spring support 22, and mechanical governor 24. Turbine hub 12 protects the enclosed components from environmental degradation and transmits rotational energy produced by blades 14 to the fore end of governor shaft 16. Turbine hub 12 can be shaped as a cone, a frustoconical, a teardrop, an airfoil, or any other shape known to those of skill in the art as being able to enclose components, be aerodynamic, and be able to withstand rotational movement.

Drive shaft 13 is connected to turbine hub 12 through bolts 15. Drive shaft 13 transfers the rotational energy of turbine hub 12 to a generator which generates the emergency power. Bolts 15 can be reversibly or irreversibly connected between turbine hub 12 and drive shaft 13. Drive shaft 13 can be hollow or solid.

Blades 14 are rotatably connected through turbine hub 12 to mechanical governor 24. In the embodiment shown in FIG. 1 there are two blades 14. Each blade 14 is shaped as an airfoil, therefore when blade 14 impacts an incoming airstream, it produces a lift force. This lift force is then translated to a rotational force since the blades are positioned with the lower surfaces of each of the airfoils in the same rotational direction. Blades 14 can be rotated by mechanical governor 24 to adjust an angle of attack of blades 14 relative to the airstream. Rotation of blades 14 can increase or decrease a surface area of the airfoil which is incident to the airstream. This increases or decreases an energy extraction rate by blades 14.

A fore portion of governor shaft 16 is in bearing 17 in a fore portion of turbine hub 12. An aft portion of governor shaft 16 is in bearing 17 in the aft portion of turbine hub. Bearing 17 in the fore portion of turbine hub 12 is connected to turbine hub 12. Bearing 17 in the aft portion of turbine hub is connected to drive shaft 13. Inside of turbine hub 12, governor shaft is surrounded circumferentially by helical governor spring 18, fixed spring support 20, sliding spring support 22, and mechanical governor 24. Governor shaft 16 can be a solid cylinder, a hollow cylinder, or any other shape know to those of skill in the art as being able to be connected to bearing 17 at two ends. Governor shaft 16 runs along and is coaxial to central axis CA. Central axis CA has a fore and an aft end. The fore end of central axis CA is near the fixed spring support 20 whereas the aft end of central axis CA is near drive shaft 13.

Helical governor spring 18 connects at a first end to fixed spring support 20 and connects at a second end to sliding spring support 22. Helical governor spring 18 can be attached to fixed spring support 20 and sliding spring support 22. Fixed spring support 20 and sliding spring support 22 are circularly shaped, with a center aligned with central axis CA. Along the radial outermost portions of fixed spring support 20 and sliding spring support 22 are spring support lips 21. Fixed spring support 20 and sliding spring support 22 restrain the axial movement of helical governor spring 18. Lips 21 restrain the radial movement of helical governor spring 18 Helical governor spring 18 is preloaded such that in the axial direction, helical governor spring 18 is primarily restrained by the circular regions of fixed spring support 20 and sliding spring support 22. Helical governor spring 18 can further be restrained in the axial direction by screws or other methods known to those of skill in the art for affixing one component to another. Helical governor spring 18 can be replaced with symmetric governor spring 26 or two-ring symmetric spring 58. Helical governor spring 18 can produce vibrations during operation caused by the non-symmetric weight distribution of helical springs. Further adding a second helical spring which is coaxial with the first spring but twisted at 180 degrees to the original to attempt to create a symmetric weight distribution does not resolve the vibrations. Symmetric governor spring 26 or two-ring symmetric spring 58 significantly reduces these vibrations since their weight distribution is symmetric and will be discussed below with respect to FIGS. 2A-4.

Fixed spring support 20 connects to governor shaft 16 in the fore region of governor shaft 16. Fixed spring support 20 can be connected to governor shaft 16 through welding, brazing, integral manufacturing, or any other method known to those of skill in the art as connecting two components. Fixed spring support 20 rotates with governor shaft 16. However, fixed spring support 20 does not translate along governor shaft 16. Sliding spring support 22 connects to mechanical governor 24 and circumferentially surrounds a central portion of governor shaft 16. Sliding spring support 22 will rotate with turbine hub 12 and sliding spring support 22 will translate along governor shaft 16 as dictated by the interaction of helical governor spring 18 and mechanical governor 24.

Mechanical governor 24 adjusts a pitch of blades 14 to maintain a fixed rotation speed range of governor shaft 16. At low airstream speeds, mechanical governor 24 will adjust blades 14 to be at a fine pitch whereas at higher airstream speeds, mechanical governor 24 will adjust blades 14 to be at a course pitch. Maintaining a constant rotational speed range of governor shaft 16 assists the generating mechanism in producing a constant, steady, and reliable stream of power. Mechanical governor 24 comprises counterweights and cams to adjust the pitch of blades 14. The desired operating speed for the turbine varies with altitude and air speed. When at lower turbine speeds, helical governor spring 18 is fully extended and acts to hold blades 14 in the fine pitch position. However, as the turbine speeds increases, the counterweights act through the cams to compress helical governor spring 18 and thereby transitioning blades 14 into the coarse pitch position.

Figure 2A:
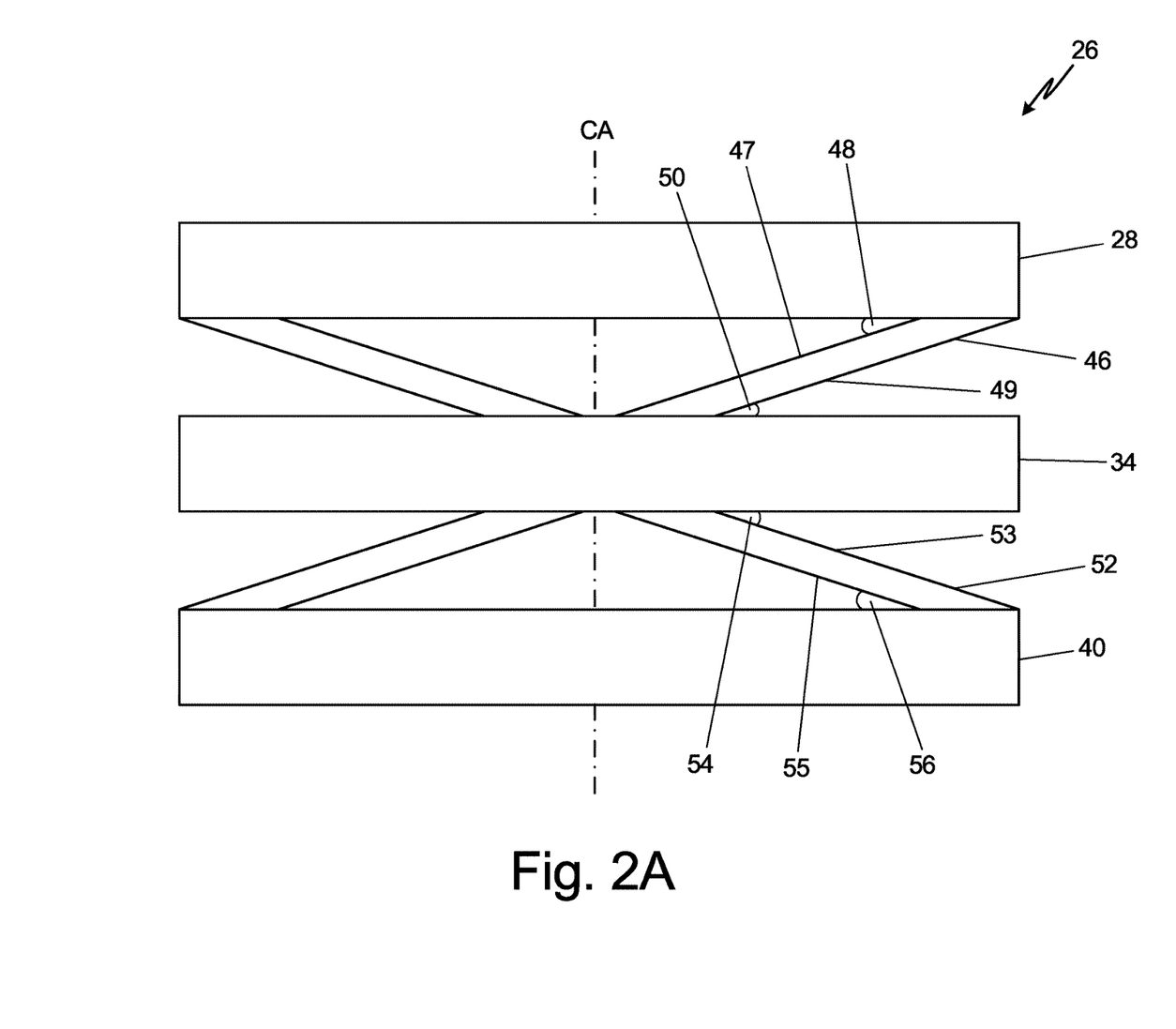
FIG. 2A is an elevation view of an embodiment of a symmetric governor spring.
Figure 2B:
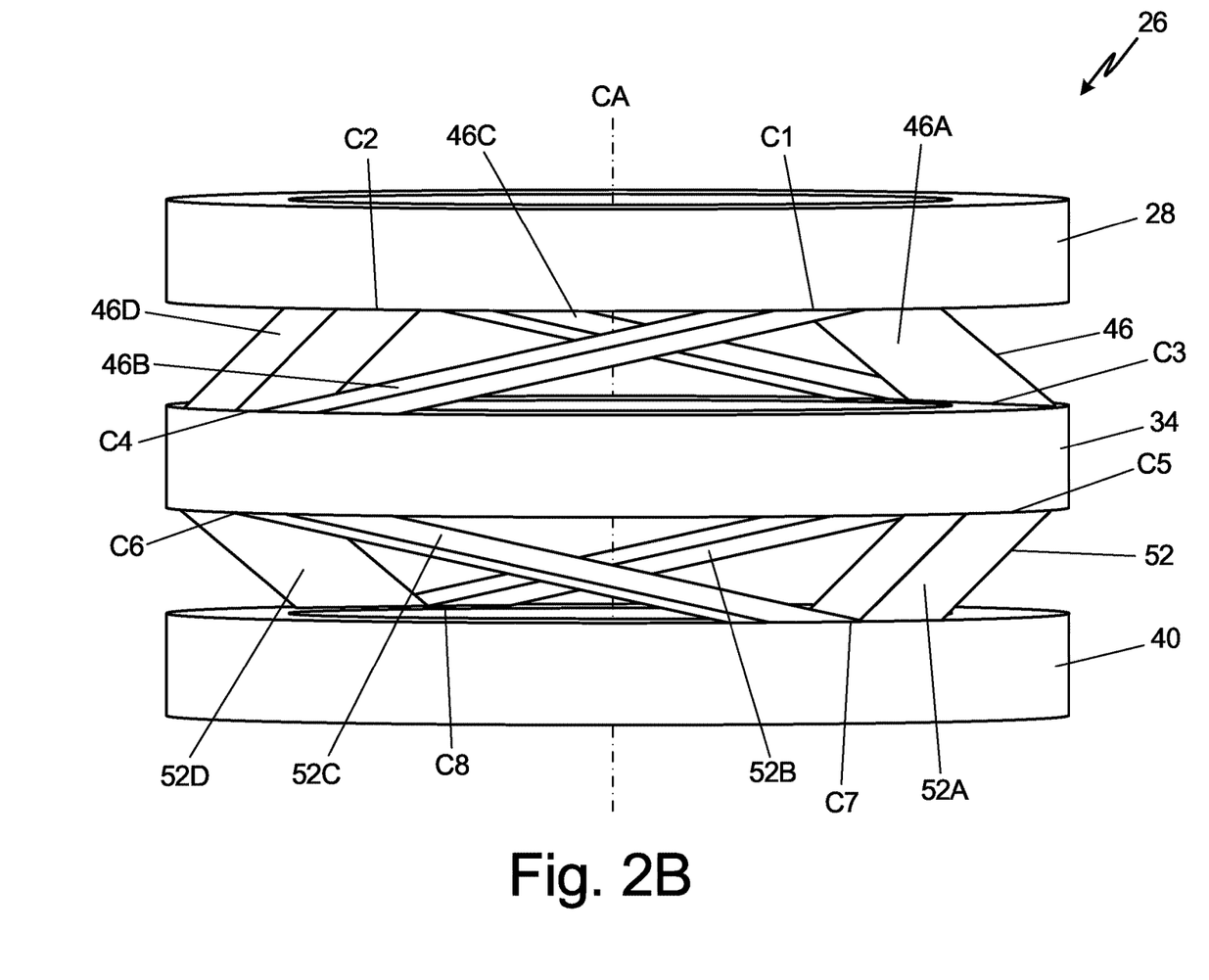
FIG. 2B is a perspective view of the symmetric governor spring of FIG. 2A, rotated 45 degrees clockwise.
Figure 2C:
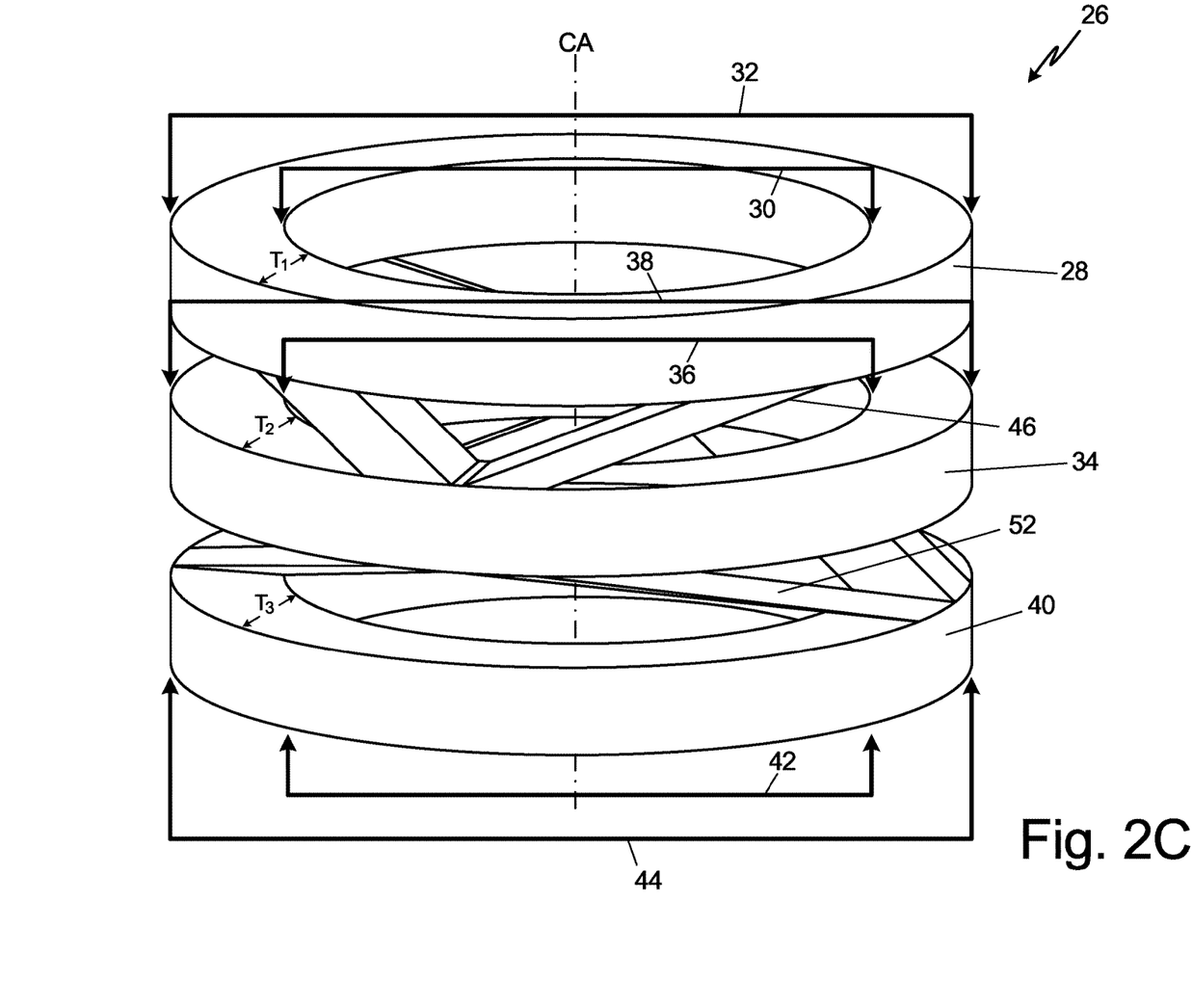
FIG. 2C is a perspective view of the symmetric governor spring of FIG. 2A, rotated 45 degrees clockwise and tilted 30 degrees.

FIGS. 2A-2C disclose an embodiment of symmetric spring 26 and will be discussed together. FIG. 2A is an elevation view of an embodiment of symmetric governor spring 26. FIG. 2B is a perspective view of symmetric governor spring 26 from FIG. 2A, rotated 45 degrees clockwise about central axis CA. As shown in FIGS. 2A and 2B, symmetric governor spring 26 includes first ring 28, second ring 34, third ring 40, first plurality of braces 46, first surface 47, first angle 48, second surface 49, second angle 50, second plurality of braces 52, third surface 53, third angle 54, fourth surface 55, fourth angle 56, and central axis CA. FIG. 2C is a perspective view of symmetric governor spring 26 from FIGS. 2A, rotated 45 degrees clockwise about central axis CA and tilted 30 degrees from central axis CA. As shown in FIG. 2C, symmetric governor spring 26 further includes first ring inner diameter 30, first ring outer diameter 32, second ring inner diameter 36, second ring outer diameter 38, third ring inner diameter 42, and third ring outer diameter 44.

First ring 28 can be a circular ring co-axial with central axis CA with first ring inner diameter 30 which is smaller than first ring outer diameter 32. First ring inner diameter 30 can be larger than or substantially equal to a diameter of governor shaft 16 since first ring 28 can circumferentially surround governor shaft 16. Second ring 34 can be a circular ring co-axial with central axis CA with second ring inner diameter 36 which is smaller than second ring outer diameter 38. Second ring inner diameter 36 can be larger than or substantially equal to a diameter of governor shaft 16 since second ring 34 can circumferentially surround governor shaft 16. Third ring 40 can be a circular ring co-axial with central axis CA with third ring inner diameter 42 which is smaller than third ring outer diameter 44. Third ring inner diameter 42 can be larger than or substantially equal to a diameter of governor shaft 16 since third ring 40 can circumferentially surround governor shaft 16. A distance between first ring inner diameter 30 and first ring outer diameter 32 is first ring thickness T1, a distance between second ring inner diameter 36 and second ring outer diameter 38 is second ring thickness T2, and a distance between third ring inner diameter 42 and third ring outer diameter 44 is third ring thickness T3. As shown in FIG. 2C, first ring inner diameter 30 can be equal to both second ring inner diameter 36 and third ring inner diameter 42. In alternative embodiments first ring inner diameter 30 can be different than second ring inner diameter 36 and/or third ring inner diameter 42. In some embodiments, first ring inner diameter 30, second ring inner diameter 36, and third ring inner diameter 42 can each have a different size from one another. As shown in FIG. 2C, first ring outer diameter 32 can be equal to both second ring outer diameter 38 and third ring outer diameter 44. In alternative embodiments first ring outer diameter 32 can be different than second ring outer diameter 38 and/or third ring outer diameter 44. In some embodiments, first ring outer diameter 32, second ring outer diameter 38, and third ring outer diameter 44 can each have a different size from one another. As shown in FIG. 2C, first ring thickness T1 can be equal to both second ring thickness T2 and third ring thickness T3. In alternative embodiments first ring thickness T1 can be different than second ring thickness T2 and/or third ring thickness T3. In some embodiments, first ring thickness T1, second ring thickness T2, and third ring thickness T3 can each have a different thickness from one another.

First ring 28, second ring 34, and third ring 40 can be axially aligned along central axis CA and spaced apart from one another on central axis CA. First ring 28 forms a first end of symmetric governor spring 26 and third ring 40 forms a second end of symmetric governor spring 26. First ring 28 can be secured to fixed spring support 20 or sliding support 22. Third ring 40 can be secured to fixed spring support 20 or sliding support 22, whichever first ring 28 is not secured to.

First ring 28 is connected to second ring 34 through first plurality of braces 46. As shown in FIGS. 2A-2C, first plurality of braces 46 comprises four individual braces 46. Braces 46 comprise first brace 46A, second brace 46B, third brace 46C, and fourth brace 46D. In the embodiment of FIGS. 2A-2C, braces 46 connect first ring 28 to second ring 34 at connection locations C1, C2, C3, and C4. Second ring 34 is connected to third ring 40 through second plurality of braces 52. As shown in FIGS. 2A-2C, second plurality of braces 52 comprises four individual braces 52. Braces 52 comprise fifth brace 52A, sixth brace 52B, seventh brace 52C, and eighth brace 52D. In the embodiment of FIGS. 2A-2C, braces 52 connect second ring 34 to third ring 40 at connection locations C5, C6, C7, and C8.

First connection location C1 and second connection location C2 are located on first ring 28 with second connection location C2 positioned diametrically opposite from first connection location C1 on first ring 28. First connection location C1 and second connection location C2 are on a first surface of first ring 28 that faces second ring 34. Third connection location C3, fourth connection location C4, fifth connection location C5, and sixth connection location C6 are all on second ring 34. Third connection location C3 and fourth connection location C4 are on a first surface of second ring 34 that faces first ring 28. Fourth connection location C4 is diametrically opposite third connection location C3 on the first face of second ring 34. Fifth connection location C5 and sixth connection location C6 are on a second surface of second ring 34, the second surface of second ring 34 being axially opposite the first surface of first ring 28 and facing third ring 40. Fifth connection location C5 is diametrically opposite sixth connection location C6 on the second surface of second ring 34. Seventh connection location C7 and eighth connection location C8 are on a first surface of third ring 40 that faces second ring 34. Eighth connection location C8 is diametrically opposite seventh connection location C7 on the first surface of third ring 40. First connection location C1 is offset from third connection location C3 by 90 degrees relative central axis CA. Seventh connection location C7 is offset from fifth connection location C5 by 90 degrees relative central axis CA. Third connection location C3 is axially opposite fifth connection location C5. Axially opposite is defined herein as being axially aligned. Fourth connection location C4 is axially opposite sixth connection location C6. First brace 46A of braces 46 extends from first connection location C1 to third connection location C3. Second brace 46B of braces 46 extends from first connection location C1 to the fourth connection location C4. Third brace 46C of braces 46 extends from second connection location C2 to third connection location C3. Fourth brace 46D of braces 46 extends from second connection location C2 to fourth connection location C4. Fifth brace 52A of braces 52 extends from fifth connection location C5 to seventh connection location C7. Sixth brace 52B of braces 52 extends from fifth connection location C5 to eighth connection location C8. Seventh brace 52C of braces 52 extends from sixth connection location C6 to seventh connection location C7. Eighth brace C8 of braces 52 extends from sixth connection location C6 to eighth connection location C8.

In alternative embodiments, first plurality of braces 46 can comprise two braces 46, six braces 46, eight braces 46, or any even number of braces 46. As shown in FIGS. 2A-2C, each of first plurality of braces 46 are straight. In alternative embodiments, braces 46 can be curved, spiral, wavy, or any other shape which can connect first ring 28 to second ring 34. Since there are an even number of braces 46 in first plurality of braces 46, each brace 46 in first plurality of braces 46 will have another brace 46 directly opposite relative central axis CA with an inverse slope. At connection locations C1-C4 adjacent braces 46 of first plurality of braces 46 can be directly abutting. In alternative embodiments, the adjacent braces 46 need not be directly abutting each other. This will be discussed in further detail with respect to FIG. 4. Each brace 46 of first plurality of braces 46 has first surface 47 facing toward first ring 28 and second surface 49 facing toward second ring 34. Each brace 46 of first plurality of braces 46 connects to first ring 28 at first angle 48 and connects to second ring 34 at second angle 50. First angle 48 can be defined as an angle between central axis CA and a vector tangent to first surface 47. Second angle 50 can be defined as an angle between central axis CA and a vector tangent to second surface 49.

In the embodiments shown, first angle 48 is equal to second angle 50. In some embodiments, first plurality of braces 46 can have a first pair braces 46 with a first value for first angle 48 and second angle 50, and a second pair of braces 46 with a second value for first angle 48 and second angle 50. In alternative embodiments, first angle 48 can be different than second angle 50. First angle 48 can be less than 3 degrees, less than 5 degrees, less than 10 degrees, less than 15 degrees, less than 20 degrees, and/or less than 25 degrees. Second angle 50 can be less than 3 degrees, less than 5 degrees, less than 10 degrees, less than 15 degrees, less than 20 degrees, and/or less than 25 degrees.

In alternative embodiments, second plurality of braces 52 can comprise two braces 52, six braces 52, eight braces 52, or any even number of braces 52. As shown in FIGS. 2A-2C, each of second plurality of braces 52 are straight. In alternative embodiments, braces 52 can be curved, spiral, wavy, or any other shape which can connect second ring 34 to third ring 40. Since there are an even number of braces 52 in second plurality of braces 52, each brace 52 in second plurality of braces 52 will have a brace 52 directly opposite relative central axis CA with an inverse slope. At connection locations C5-C8 adjacent braces 52 of second plurality of braces 52 can be directly abutting. In alternative embodiments, the adjacent braces 52 need not be directly abutting each other. This will be discussed in further detail with respect to FIG. 4. Each brace 52 of second plurality of braces 52 has third surface 53 facing toward second ring 34 and fourth surface 55 facing third ring 40. Each brace 52 of second plurality of braces 52 connects to second ring 34 at third angle 54 and connects to third ring 40 at fourth angle 56. Third angle 54 can be defined as an angle between central axis CA and a vector tangent to third surface 53. Fourth angle 56 can be defined as an angle between central axis CA and a vector tangent to fourth surface 55.

In the embodiments shown, third angle 54 is equal to fourth angle 56. In some embodiments, second plurality of braces 52 can have a first pair braces 52 with a first value for third angle 54 and fourth angle 56, and a second pair of braces 52 with a second value for third angle 54 and fourth angle 56. In alternative embodiments, third angle 54 can be different than fourth angle 56. Third angle 54 can be less than 3 degrees, less than 5 degrees, less than 10 degrees, less than 15 degrees, less than 20 degrees, and/or less than 25 degrees. Fourth angle 56 can be less than 3 degrees, less than 5 degrees, less than 10 degrees, less than 15 degrees, less than 20 degrees, and/or less than 25 degrees.

As shown in FIGS. 2A-2C, symmetric spring 26 comprises three rings, first ring 28, second ring 34, and third ring 40, and two pluralities of braces, first plurality of braces 46 and second plurality of braces 52. In alternative embodiments, symmetric spring 26 can include N rings and N−1 pluralities of braces. Each ring of the N rings is substantially as described above with respect to first ring 28, second ring 34, and third ring 40. Each plurality of braces of the N−1 pluralities of braces is connect to two of the N rings substantially as described above with respect to first plurality of braces 46 and second plurality of braces 52. Increasing the number of rings from 3 or 2 rings to N rings can be advantageous over the springs as described in FIGS. 2A-3C, if a spring is desired which has a lower stiffness but spans a larger axial distance.

If symmetric spring 26 is under axial load, first plurality of braces 46 and second plurality of braces 52 effectively transfer the load through the spring since first angle 48, second angle 50, third angle 54, and fourth angle 56 are acute angles. The stiffness of symmetric spring 26 can be optimized by changing a material it is made of, altering first angle 48, second angle 50, third angle 54, fourth angle 56, or by altering a thickness or width of each of the braces of first plurality of braces 46 or second plurality of braces 52. Decreasing first angle 48, second angle 50, third angle 54, or fourth angle 56 will decrease a stiffness of symmetric spring 26. The stiffness of symmetric spring 26 can be less than 3000 lbf/in, less than 2000 lbf/in less than 1500 lbf/in, and/or less than 1000 lbf/in.

Symmetric governor spring 26 and two-ring symmetric spring 58 (shown in FIGS. 3A-3C) can be manufactured via subtractive manufacturing or additive manufacturing. Subtractively manufacturing symmetric governor spring 26 or two-ring symmetric spring 58 would involve either milling the part out of a single larger block or milling the individual components. Milling the individual components would involve milling each of the rings and braces and then combining them through welding, brazing, or any other method know to those of skill in the art for combining components. Additively manufacturing the component would involve selectively sintering a portion of metallic powder, laying a new layer of metallic powder on the previous layer and repeating this process until the part is completed. Once the part has been completed, the excess powder can be removed. The surface of the part can be polished or smoothed to improve the material characteristics of the part. Further, symmetric governor spring 26 and two-ring symmetric spring 58 can have a coating to improve corrosion resistance.

Symmetric governor spring 26 or two-ring symmetric spring 58 can replace helical spring 18 in ram air turbine 10. When helical spring 18 is replaced with either symmetric governor spring 26 or two-ring symmetric spring 58, the vibrations produced during operation of ram air turbine 10 are significantly reduced. By reducing the vibrations produced during operation of ram air turbine 10, the size of associated parts in ram air turbine 10 can be reduced. Reducing the vibrations also reduces noise production within the aircraft for occupants and pilots. The weight of symmetric governor spring 26 is distributed symmetrically about central axis CA, as such the weight of symmetric governor spring 26 is distributed symmetrically about central axis CA. Two-ring symmetric spring 58 is discussed in greater detail below with reference to FIGS. 3A-3C.

Figure 3A:
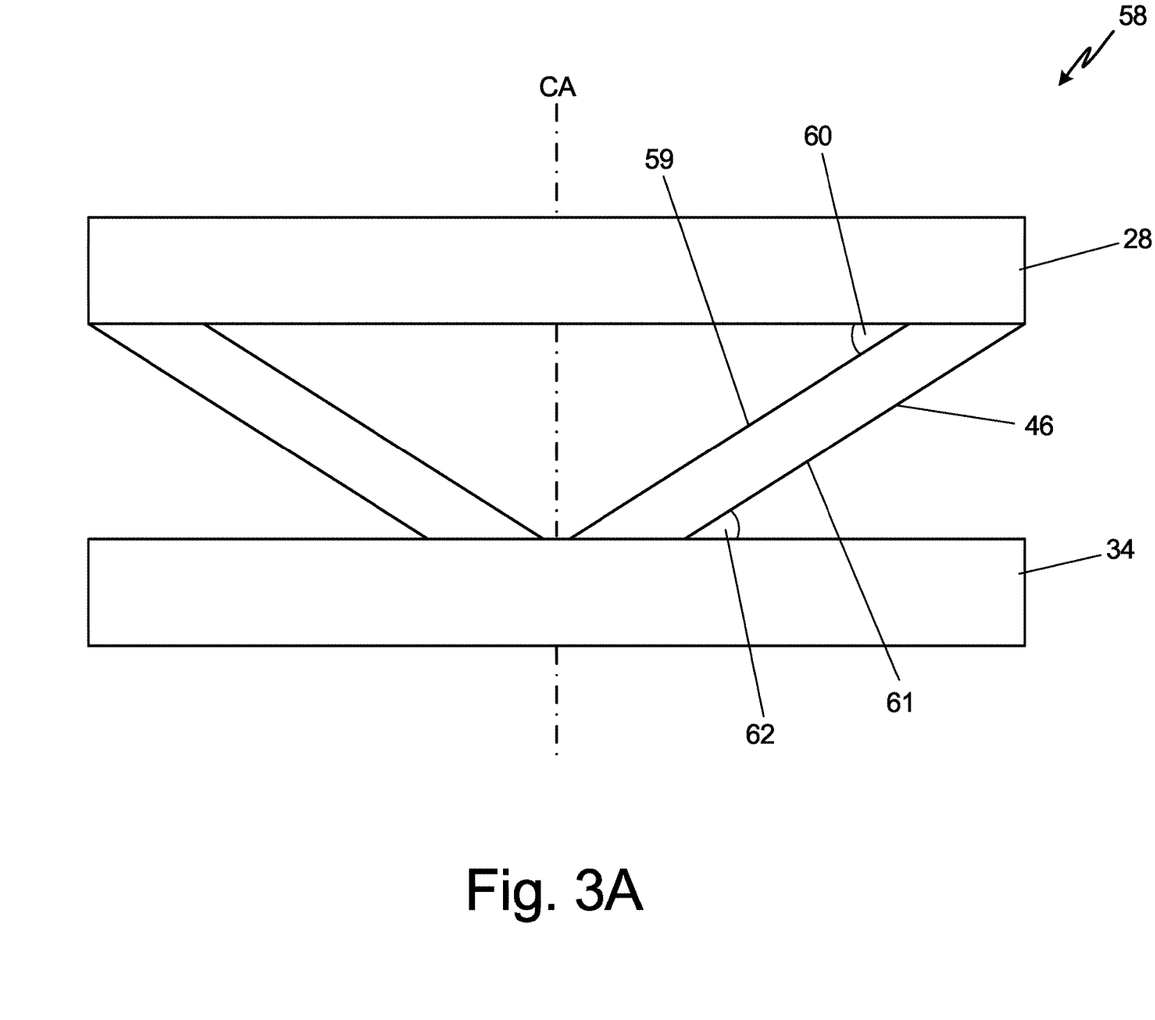
FIG. 3A is an elevation view of a second embodiment of a symmetric governor spring.
Figure 3B:
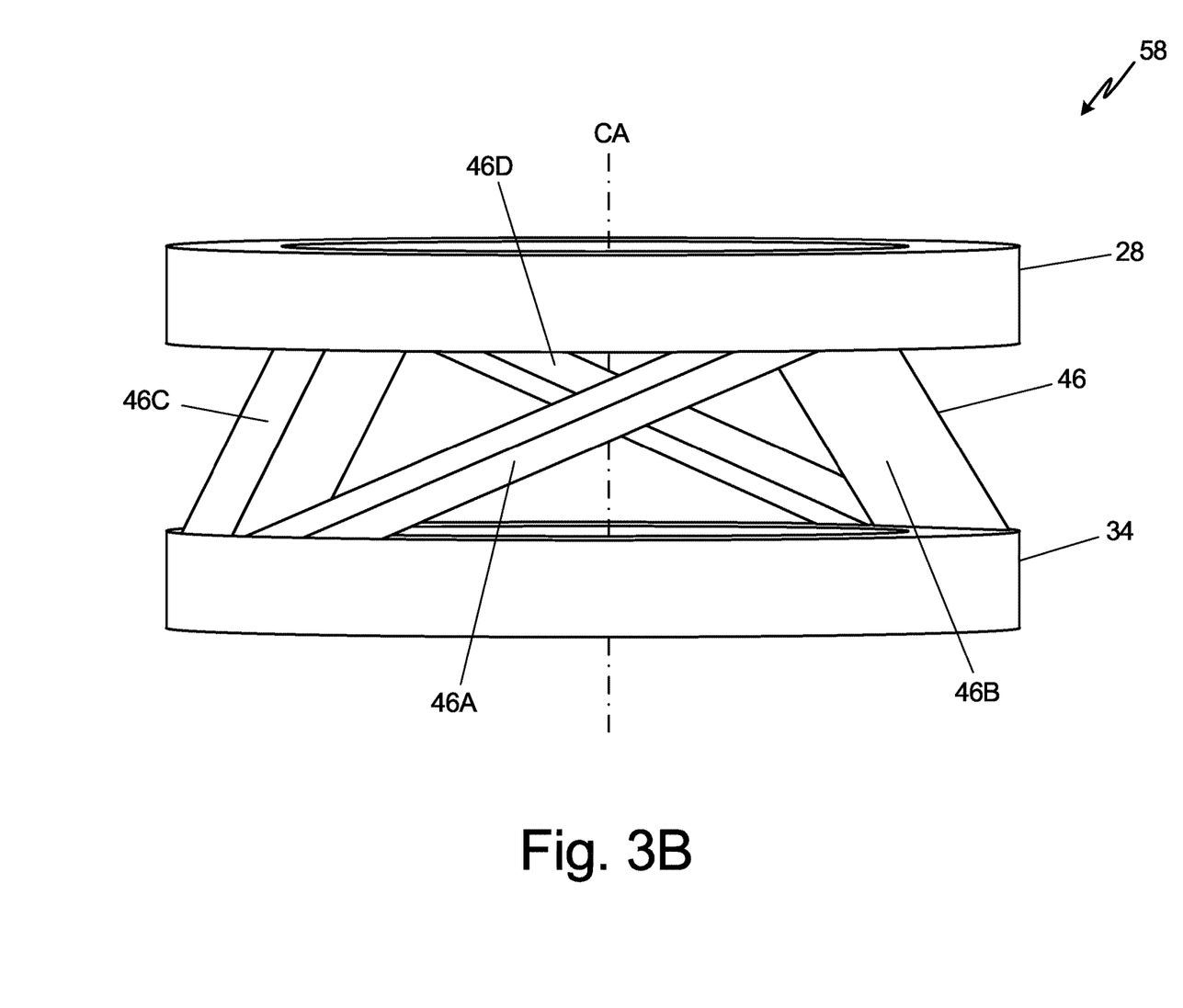
FIG. 3B is a perspective view of the symmetric governor spring of FIG. 3A, rotated 45 degrees clockwise.
Figure 3C:
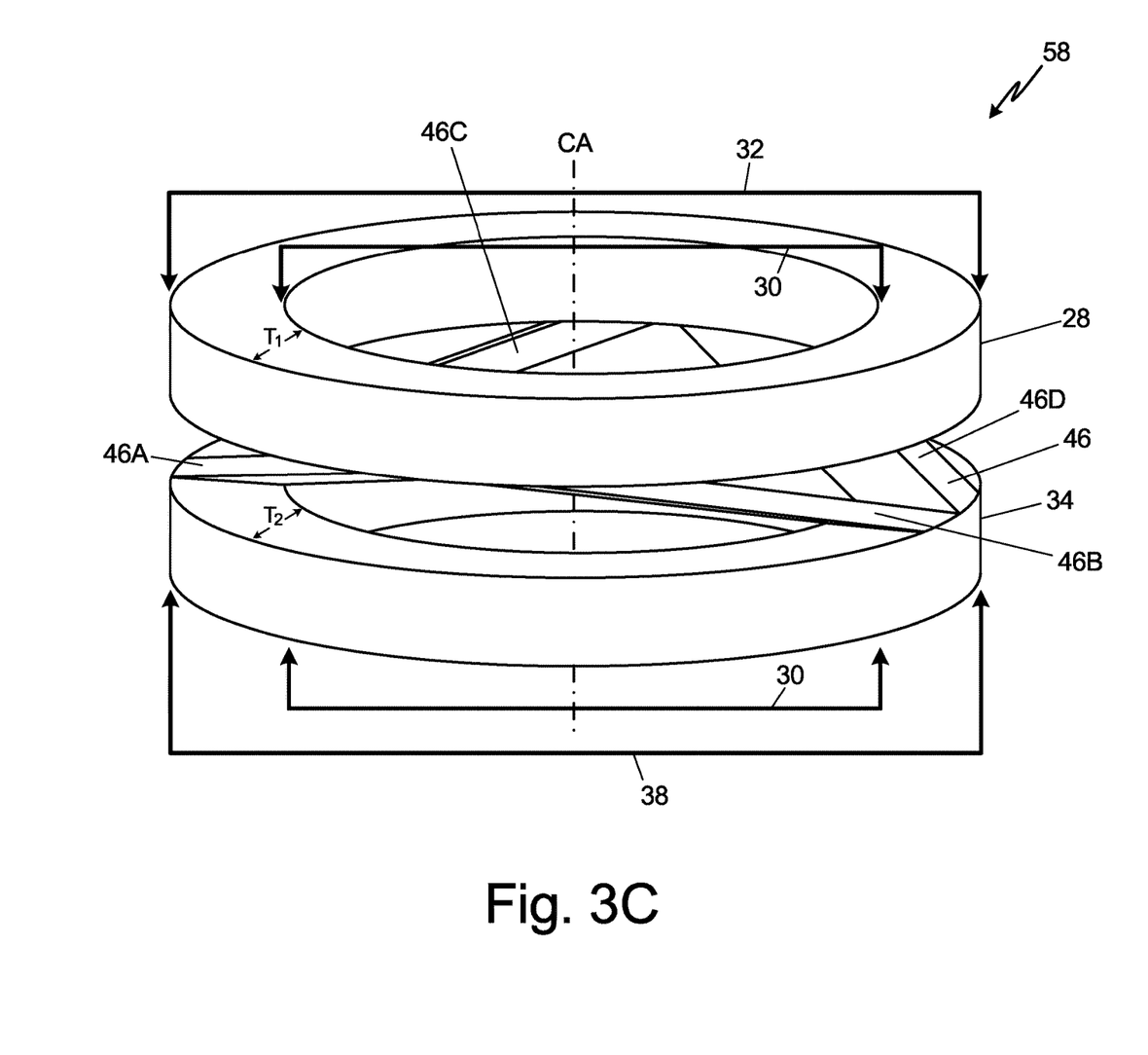
FIG. 3C is a perspective view of the symmetric governor spring of FIG. 3A, rotated 45 degrees clockwise and tilted 30 degrees.

FIGS. 3A-3C disclose an embodiment of two-ring symmetric spring 58 and will be discussed together. FIG. 3A is an elevation view of an embodiment of two-ring symmetric spring 58. FIG. 3B is a perspective view of two-ring symmetric spring 58. As shown in FIGS. 3A and 3B, two-ring symmetric spring 58 includes first ring 28, second ring 34, first plurality of braces 46, first surface 59, first angle 60, second surface 61, second angle 62, and central axis CA. FIG. 3C is a perspective view of two-ring symmetric spring 58, rotated 45 degrees clockwise about central axis CA and tilted 30 degrees relative central axis CA. As shown in FIG. 3C, two-ring symmetric spring 58 further includes first ring inner diameter 30, first ring outer diameter 32, second ring inner diameter 36, and second ring outer diameter 38.

First ring 28, first ring inner diameter 30, first ring outer diameter 32, second ring 34, second ring inner diameter 36, second ring outer diameter 38, first plurality of braces 46, and central axis CA are substantially the same as described above with respect to FIGS. 2A-2C. In the embodiment of FIG. 3A-3C, first plurality of braces 46 comprises four braces. Braces 46 comprises first brace 46A, second brace 46B, third brace 46C, and fourth brace 46D. First brace 46A extends from first ring 28 to second ring 34. Second brace 46B extends from first ring 28 to second ring 34. Second brace 46B and first brace 46A diverge from one another as first brace 46A and second brace 46B extend from first ring 28 to second ring 34. Third brace 46C extends from first ring 28 to second ring 34. Third brace 46C and first brace 46A converge toward one another as first brace 46A and third brace 46C extend from first ring 28 to second ring 34. Fourth brace 46D extends from first ring 28 to second ring 34. Third brace 46C and fourth brace 46D diverge from one another as third brace 46C and fourth brace 46D extend from first ring 28 to second ring 34. Second brace 46B and fourth brace 46D converge toward one another as second brace 46B and fourth brace 46D extend from first ring 28 to second ring 34.

Each brace 46 of first plurality of braces 46 has first surface 59 facing first ring 28 and second surface 61 facing second ring 34. Substantially as described above with respect to FIGS. 2A-2C, first angle 60 can be defined as an angle between central axis CA and a vector tangent to first surface 59 while second angle 62 can be defined as an angle between central axis CA and a vector tangent to second surface 61. All other components held equal, first angle 60 and second angle 62 are approximately double first angle 48 and second angle 50, respectively, as described above with respect to FIGS. 2A-2C. These angles are approximately double since first plurality of braces 46 must span twice the distance in two-ring symmetric spring 58 as first plurality of braces 46 in symmetric governor spring 26. First angle 60 can be less than 5 degrees, less than 10 degrees, less than 15 degrees, less than 25 degrees, less than 35 degrees, and/or less than 45 degrees. Second angle 62 can be less than 5 degrees, less than 10 degrees, less than 15 degrees, less than 25 degrees, less than 35 degrees, and/or less than 45 degrees. Removing third ring 40 and second plurality of braces 52 from FIGS. 2A-2C as shown in FIGS. 3A-3C can increase the stiffness of two-ring symmetric spring 58 in comparison to symmetric governor spring 26. If all other variables are held constant, the stiffness of two-ring symmetric spring 58 will be double that of symmetric spring 26. The stiffness of two-ring symmetric spring 58 can be optimized by changing a material two-ring symmetric spring 58 is made of, altering first angle 60, second angle 62, or by altering a thickness or width of each of the braces of first plurality of braces 46. The stiffness of symmetric spring 26 can be less than 3000 lbf/in, less than 2000 lbf/in less than 1500 lbf/in, and/or less than 1000 lbf/in. The weight of two-ring symmetric spring 58 is distributed symmetrically about central axis CA, as such the weight of two-ring symmetric spring 58 is distributed symmetrically about central axis CA.

Figure 4:
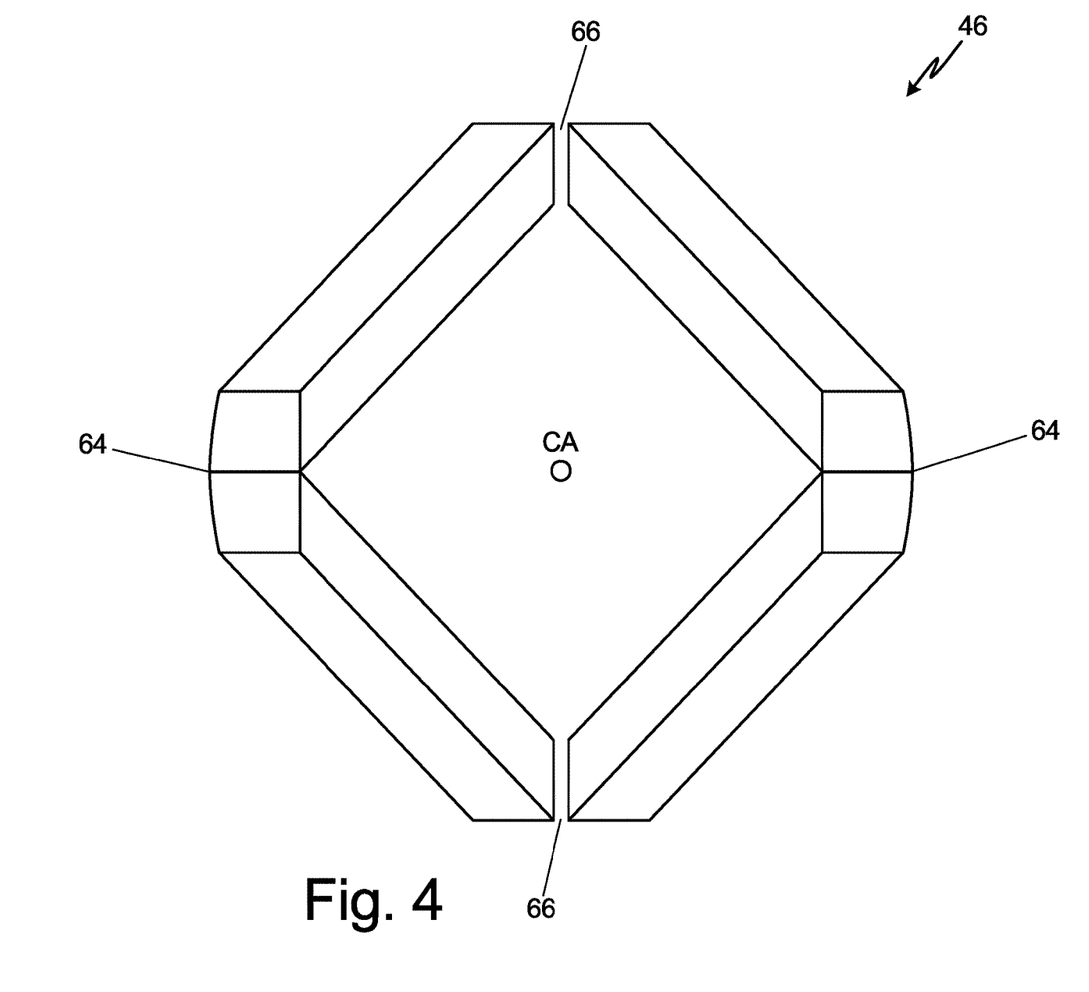
FIG. 4 is a top view of braces of the governor spring of FIG. 3A.

FIG. 4 is a top view of first plurality of braces 46 of an embodiment of symmetric governor spring 26. FIG. 4 includes first plurality braces 46 closed connections 64, open connections 66, and central axis CA.

In the embodiment shown in FIG. 4, there are four individual braces 46. These braces 46 are symmetrically distributed about central axis CA. As discussed above with respect to FIGS. 2A-3C there can be any even number of braces 46. Where braces 46 meet can be either closed connection 64 or open connection 66. Closed connection 64 is a connection point between braces 46 of first plurality of braces 46 and a ring (omitted from view) where braces 64 contact each other. When braces 46 contact each other, it can increase a strength and stiffness of first plurality braces 46, thereby increasing a strength and stiffness of symmetric governor spring 26. Open connection 66 is a connection point between braces 46 of first plurality of braces 46 and a ring where braces 46 do not contact each other. When braces 46 do not contact each other, it can decrease a strength and stiffness of first plurality braces 46, thereby decreasing a strength and stiffness of symmetric governor spring 26. In the embodiment shown in FIG. 4, there are two closed connections 64 and two open connections 66. In alternative embodiments, there can be any number of closed connections 64 and open connections 66, in any distribution. In the embodiment shown in FIG. 4, braces 46 are straight. Specifically, braces 46 extend directly from closed connection 64 to open connection 66. In alternative embodiments, braces 46 can be curved, spiral, wavy, or any other shape which enables a connection between rings.

Discussion of Possible Embodiments

The following are non-exclusive descriptions of possible embodiments of the present invention.

A symmetric governor spring

The symmetric governor spring of the preceding paragraph can optionally include, additionally and/or alternatively, any one or more of the following features, configurations and/or additional components:

A first ring, a second ring coaxial with the first ring, and two or more inclined braces connecting the first ring to the second ring. The first ring, the second ring, and the two or more inclined braces are integrally formed.

A further embodiment of the foregoing symmetric governor spring, wherein the symmetric governor spring is additively manufactured.

A further embodiment of any of the foregoing symmetric governor springs, wherein an inner diameter of the first ring is equal to an inner diameter of the second ring.

A further embodiment of any of the foregoing symmetric governor springs, wherein an outer diameter of the first ring is equal to an outer diameter of the second ring.

A further embodiment of any of the foregoing symmetric governor springs, further includes a first brace extending from the first ring to the second ring and a second brace extending from the first ring to the second ring. The second brace and the first brace diverge from one another as the first brace and the second brace extend from the first ring to the second ring. The governor spring further includes a third brace extending from the first ring to the second ring, where the third brace and the first brace converge toward one another as the first brace and the third brace extend from the first ring to the second ring. The governor spring further includes a fourth brace extending from the first ring to the second ring, where the third brace and the fourth brace diverge from one another as the third brace and the fourth brace extend from the first ring to the second ring. Further, the second brace and the fourth brace converge toward one another as the second brace and the fourth brace extend from the first ring to the second ring.

A further embodiment of any of the foregoing symmetric governor springs, wherein the two or more inclined braces comprises six inclined braces connecting the first ring to the second ring.

A further embodiment of any of the foregoing symmetric governor springs, wherein each of the two or more inclined braces connects to the first ring at a first angle, the first angle defined as an angle between a central axis of the symmetric governor spring and a vector tangent to a first surface of a brace of the two or more inclined braces. Each of the two or more inclined braces connects to the second ring at a second angle, the second angle defined as an angle between the central axis of the symmetric governor spring and a vector tangent to a second surface of the brace of the two or more inclined braces and the first angle is equal to the second angle.

A symmetric governor spring.

The symmetric governor spring of the preceding paragraph can optionally include, additionally and/or alternatively, any one or more of the following features, configurations and/or additional components:

A first ring coaxial with a central axis, a second ring coaxial with the first ring, and a third ring coaxial with the first ring. The symmetric governor spring can further include a first set of two or more inclined braces connecting the first ring to the second ring and a second set of two or more inclined braces connecting the second ring to the third ring.

A further embodiment of the foregoing symmetric governor spring, wherein the first ring, the second ring, the third ring, the first set of two or more inclined braces, and the second set of two or more inclined braces are integrally formed.

A further embodiment of any of the foregoing symmetric governor springs, wherein the symmetric governor spring is additively manufactured.

A further embodiment of any of the foregoing symmetric governor springs, wherein an inner diameter of the first ring is equal to an inner diameter of the second ring and an inner diameter of the third ring.

A further embodiment of any of the foregoing symmetric governor springs, wherein an outer diameter of the first ring is equal to an outer diameter of the second ring and an outer diameter of the third ring.

A further embodiment of any of the foregoing symmetric governor springs, wherein each of the first set of two or more inclined braces connects to the first ring at a first angle, the first angle defined as an angle between the central axis and a vector tangent to a first surface of a brace of the first set of two or more inclined braces. Further, each of the first set of two or more inclined braces connects to the second ring at a second angle, the second angle defined as an angle between the central axis and a vector tangent to a second surface of a brace of the first set of two or more inclined braces. The first angle is equal to the second angle.

A further embodiment of any of the foregoing symmetric governor springs, wherein each of the second set of two or more inclined braces connects to the second ring at a third angle, the third angle defined as an angle between the central axis and a vector tangent to a first surface of a brace of the second set of two or more inclined braces. Further, each of the second set of two or more inclined braces connects to the third ring at a fourth angle, the fourth angle defined as an angle between the central axis and a vector tangent to a second surface of a brace of the second set of two or more inclined braces. The third angle is equal to the fourth angle.

A further embodiment of any of the foregoing symmetric governor springs, wherein the first angle is equal to the third angle.

A further embodiment of any of the foregoing symmetric governor springs, wherein the first ring has a first connection location and a second connection location diametrically opposite the first connection location. The first connection location and the second connection location are on a first surface of the first ring. The second ring has a third connection location, a fourth connection location, a fifth connection location, and a sixth connection location. The fourth connection location is diametrically opposite the third connection location and the fifth connection location is diametrically opposite the sixth connection location. The third connection location and the fourth connection location are on a first surface of the first ring and the fifth connection location and the sixth connection location are on a second surface of the second ring, the second surface of the second ring being axially opposite the first surface of the first ring. The third ring has a seventh connection location and an eighth connection location, the eighth connection location diametrically opposite the seventh connection location. The seventh connection location and the eighth connection location are on a first surface of the third ring. The first connection location is offset from the third connection location by 90 degrees relative the central axis and the seventh connection location is offset from the fifth connection location by 90 degrees relative the central axis. The third connection location is axially opposite the fifth connection location and the fourth connection location is axially opposite the sixth connection location. A first brace of the first set of two or more inclined braces extends from the first connection location to the third connection location, a second brace of the first set of two or more inclined braces extends from the first connection location to the fourth connection location, a third brace of the first set of two or more inclined braces extends from the second connection location to the third connection location, and a fourth brace of the first set of two or more inclined braces extends from the second connection location to the fourth connection location. A fifth brace of the second set of two or more inclined braces extends from the fifth connection location to the seventh connection location, a sixth brace of the second set of two or more inclined braces extends from the fifth connection location to the eighth connection location, a seventh brace of the second set of two or more inclined braces extends from the sixth connection location to the seventh connection location, and an eighth brace of the second set of two or more inclined braces extends from the sixth connection location to the eighth connection location.

A ram air turbine.

The ram air turbine of the preceding paragraph can optionally include, additionally and/or alternatively, any one or more of the following features, configurations and/or additional components:

Turbine blades rotatably attached to a turbine hub, a governor mechanism within the turbine hub for automatically adjusting a pitch of the turbine blades to maintain a rotational speed range of the turbine hub. The governor mechanism includes a governor shaft defining a central axis, a symmetric governor spring extending circumferentially about the governor shaft. The symmetric governor spring includes a first ring coaxial with the central axis and defining a first end of the symmetric governor spring, a second ring coaxial with the central axis, and a third ring coaxial with the central axis and defining a second end of the symmetric governor spring. The spring further includes a first set of two or more inclined braces connecting the first ring to the second ring and a second set of two or more inclined braces connecting the second ring to the third ring. The governor mechanism further includes a fixed spring support connected to the first end of the symmetric governor spring and a sliding spring support connected to the second end of the symmetric governor spring.

A further embodiment of the foregoing symmetric governor spring, wherein the governor spring is symmetrically weighted.

A further embodiment of any of the foregoing symmetric governor springs, wherein the governor spring is integrally formed.

A further embodiment of any of the foregoing symmetric governor springs, wherein a stiffness of the governor spring is less than 1500 lbf/in.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An symmetric governor spring comprising:
a first ring;
a second ring coaxial with the first ring;
two or more inclined braces connecting the first ring to the second ring;
a first brace extending from the first ring to the second ring;
a second brace extending from the first ring to the second ring, wherein the second brace and the first brace diverge from one another as the first brace and the second brace extend from the first ring to the second ring;

a third brace extending from the first ring to the second ring, wherein the third brace and the first brace converge toward one another as the first brace and the third brace extend from the first ring to the second ring; and
a fourth brace extending from the first ring to the second ring, wherein the third brace and the fourth brace diverge from one another as the third brace and the fourth brace extend from the first ring to the second ring, and wherein the second brace and the fourth brace converge toward one another as the second brace and the fourth brace extend from the first ring to the second ring,
wherein the first ring, the second ring, and the two or more inclined braces are integrally formed.

2. The symmetric governor spring of claim 1, wherein the symmetric governor spring is additively manufactured.

3. The symmetric governor spring of claim 1, wherein an inner diameter of the first ring is equal to an inner diameter of the second ring.

4. The symmetric governor spring of claim 1, wherein an outer diameter of the first ring is equal to an outer diameter of the second ring.

5. The symmetric governor spring of claim 1, wherein the two or more inclined braces comprises six inclined braces connecting the first ring to the second ring.

6. The symmetric governor spring of claim 1, wherein:
each of the two or more inclined braces connects to the first ring at a first angle, the first angle defined as an angle between a central axis of the symmetric governor spring and a vector tangent to a first surface of a brace of the two or more inclined braces;
each of the two or more inclined braces connects to the second ring at a second angle, the second angle defined as an angle between the central axis of the symmetric governor spring and a vector tangent to a second surface of the brace of the two or more inclined braces; and
the first angle is equal to the second angle.

7. An symmetric governor spring comprising:
a first ring coaxial with a central axis;
a second ring coaxial with the first ring;
a third ring coaxial with the first ring;
a first set of two or more inclined braces connecting the first ring to the second ring; and
a second set of two or more inclined braces connecting the second ring to the third ring
wherein each of the first set of two or more inclined braces connects to the first ring at a first angle, the first angle defined as an angle between the central axis and a vector tangent to a first surface of a brace of the first set of two or more inclined braces;
wherein each of the first set of two or more inclined braces connects to the second ring at a second angle, the second angle defined as an angle between the central axis and a vector tangent to a second surface of a brace of the first set of two or more inclined braces; and
wherein the first angle is equal to the second angle.

8. The symmetric governor spring of claim 7, wherein the first ring, the second ring, the third ring, the first set of two or more inclined braces, and the second set of two or more inclined braces are integrally formed.

9. The symmetric governor spring of claim 7, wherein the symmetric governor spring is additively manufactured.

10. The symmetric governor spring of claim 7, wherein an inner diameter of the first ring is equal to an inner diameter of the second ring and an inner diameter of the third ring.

11. The symmetric governor spring of claim 7, wherein an outer diameter of the first ring is equal to an outer diameter of the second ring and an outer diameter of the third ring.

12. The symmetric governor spring of claim 7, wherein:
each of the second set of two or more inclined braces connects to the second ring at a third angle, the third angle defined as an angle between the central axis and a vector tangent to a first surface of a brace of the second set of two or more inclined braces;
each of the second set of two or more inclined braces connects to the third ring at a fourth angle, the fourth angle defined as an angle between the central axis and a vector tangent to a second surface of a brace of the second set of two or more inclined braces; and
the third angle is equal to the fourth angle.

13. The symmetric governor spring of claim 12, wherein the first angle is equal to the third angle.

14. The symmetric governor spring of claim 7, wherein:
the first ring has a first connection location and a second connection location diametrically opposite the first connection location;
the first connection location and the second connection location are on a first surface of the first ring;
the second ring has a third connection location, a fourth connection location, a fifth connection location, and a sixth connection location;
the fourth connection location is diametrically opposite the third connection location
the fifth connection location is diametrically opposite the sixth connection location;
the third connection location and the fourth connection location are on a first surface of the first ring;
the fifth connection location and the sixth connection location are on a second surface of the second ring, the second surface of the second ring being axially opposite the first surface of the first ring;
the third ring has a seventh connection location and an eighth connection location, the eighth connection location diametrically opposite the seventh connection location;
the seventh connection location and the eighth connection location are on a first surface of the third ring;
the first connection location is offset from the third connection location by 90 degrees relative the central axis;
the seventh connection location is offset from the fifth connection location by 90 degrees relative the central axis;
the third connection location is axially opposite the fifth connection location;
the fourth connection location is axially opposite the sixth connection location;
a first brace of the first set of two or more inclined braces extends from the first connection location to the third connection location;
a second brace of the first set of two or more inclined braces extends from the first connection location to the fourth connection location;
a third brace of the first set of two or more inclined braces extends from the second connection location to the third connection location;
a fourth brace of the first set of two or more inclined braces extends from the second connection location to the fourth connection location;
a fifth brace of the second set of two or more inclined braces extends from the fifth connection location to the seventh connection location;

a sixth brace of the second set of two or more inclined braces extends from the fifth connection location to the eighth connection location;

a seventh brace of the second set of two or more inclined braces extends from the sixth connection location to the seventh connection location; and an eighth brace of the second set of two or more inclined braces extends from the sixth connection location to the eighth connection location.

15. A ram air turbine comprising:

turbine blades rotatably attached to a turbine hub; and a governor mechanism within the turbine hub for automatically adjusting a pitch of the turbine blades to maintain a rotational speed range of the turbine hub, the governor mechanism comprising:

a governor shaft defining a central axis;

an symmetric governor spring extending circumferentially about the governor shaft, wherein the symmetric governor spring comprises:

a first ring coaxial with the central axis and defining a first end of the symmetric governor spring;

a second ring coaxial with the central axis;

a third ring coaxial with the central axis and defining a second end of the symmetric governor spring;

a first set of two or more inclined braces connecting the first ring to the second ring; and       a second set of two or more inclined braces connecting the second ring to the third ring;

a fixed spring support connected to the first end of the symmetric governor spring; and    a sliding spring support connected to the second end of the symmetric governor spring; and    wherein the governor spring is symmetrically weighted.

16. The ram air turbine of claim 15, wherein the governor spring is integrally formed.

17. The ram air turbine of claim 15, wherein a stiffness of the governor spring is less than 1500 lbf/in.

* * * * *